United States Patent
Gaalswyk et al.

[11] Patent Number: 5,871,081
[45] Date of Patent: Feb. 16, 1999

[54] CONCENTRIC AUGER FEEDER

[75] Inventors: Mark K. Gaalswyk, Welcome; Mark A. Owens, Truman, both of Minn.

[73] Assignee: Easy Systems, Inc., Welcome, Minn.

[21] Appl. No.: 746,330

[22] Filed: Nov. 12, 1996

[51] Int. Cl.[6] ............ B65G 33/26; B65G 43/00; B65G 33/34; G01F 11/20
[52] U.S. Cl. ............ 198/662; 198/661; 198/674; 198/502.4; 222/412; 222/413
[58] Field of Search ............ 198/661, 662, 198/674, 502.4; 222/412, 413

[56] References Cited

U.S. PATENT DOCUMENTS

| | | | |
|---|---|---|---|
| 1,444,775 | 2/1923 | Bennett | 198/502.4 |
| 2,225,215 | 12/1940 | Guthrie | 198/661 |
| 3,439,836 | 4/1969 | Ricciardi | 222/413 |
| 4,194,844 | 3/1980 | Walling | 198/662 |
| 4,236,627 | 12/1980 | Sigott et al. | 198/502.4 |
| 4,273,267 | 6/1981 | Conca | 222/412 |
| 4,356,910 | 11/1982 | Togstad | 198/660 |

Primary Examiner—James R. Bidwell
Assistant Examiner—Joe Dillon, Jr.
Attorney, Agent, or Firm—Henderson & Sturm

[57] ABSTRACT

A material conveying system for accurately conveying a specific predetermined amount of a material. The system includes a large primary auger that is rotated to convey the material until the amount of material closely approaches the predetermined amount. A smaller secondary auger, disposed coaxially with the primary auger, is then rotated to convey material until the amount of material conveyed reaches the predetermined amount.

25 Claims, 2 Drawing Sheets

CONCENTRIC AUGER FEEDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field

This invention relates to material conveying systems and methods, and more particularly to conveying systems and methods using multiple augers.

2. Description of Related Art

In many industries, chemicals and compounds are used that are very difficult to handle automatically and accurately. The materials tend to bridge up and not flow in conventional material handling equipment. If larger diameter screw augers are used—the material will flow better—but it is virtually impossible to shut off equipment with very precise accuracy. If small augers are used, ingredient cut off accuracies can be achieved—but the smaller augers are much slower and complicate the material handling problems as they tend to cake up, and the material will not feed into them correctly. Some have tried to use slightly larger augers operating at a very high speed—but this higher speed can create heat which can cause ingredients with lower melting points to become sticky, clog up the screw auger and change material characteristics. In the past, some attempts have been made to accomplish this by utilizing vibrators, agitators, auger cleaners, feeder massagers and other devices. This equipment can be very costly and contribute to a high cost of automating such ingredient handling systems. Consequently, many industries using chemicals with these difficult properties have not been able to effectively automate.

Those concerned with these and other problems recognize the need for an improved material conveying system.

BRIEF SUMMARY OF THE INVENTION

Disclosure of the Invention

The present invention provides a material conveying system for accurately conveying a specific predetermined amount of a material. The system includes a large primary auger that is rotated to convey the material until the amount of material closely approaches the predetermined amount. A smaller secondary auger, disposed coaxially with the primary auger, is then rotated to convey material until the amount of material conveyed reaches the predetermined amount.

On an automatic ingredient processing system for 5 to 10 ingredients, such as that used in the manufacture of rubber tires, the savings over prior methods of automation can be substantial with a significant improvement in accuracy.

An object of the present invention is the provision of an improved material conveying system.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Best Mode for Carrying Out the Invention

Figure 1:
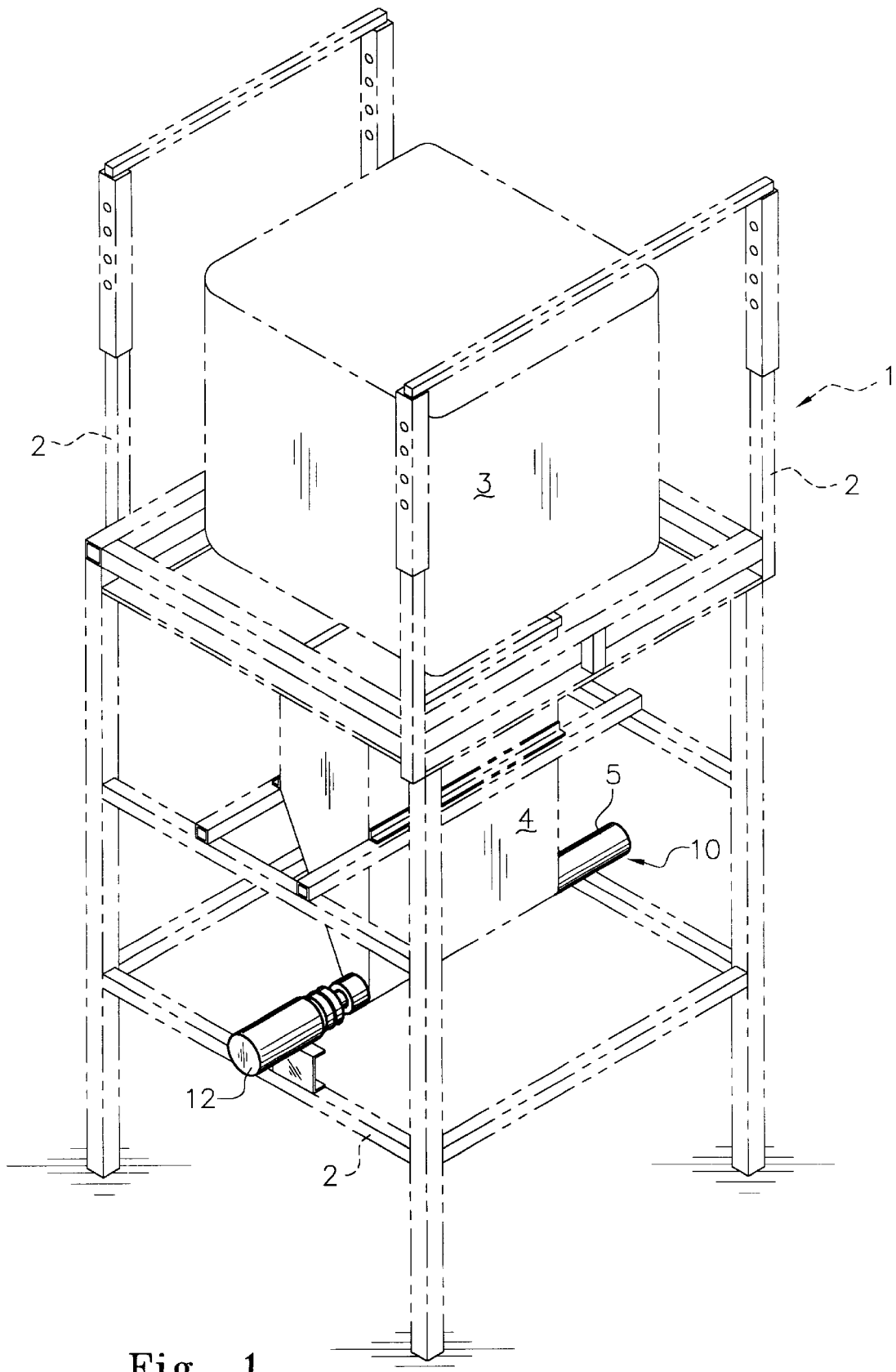
FIG. 1 is a perspective view of a material conveying system using the concentric auger feeder of the present invention.

Referring now to the drawings, wherein like reference numerals designate identical or corresponding parts throughout the several views, FIG. 1 shows a material conveying system (1) using the concentric auger feeder (10) of the present invention. Although numerous alternate designs could be used, the material conveying system (1) illustrated includes an adjustable frame (2) that supports a bulk bag (3) which carries a supply of material. The material discharges from the bag (3) into a feed hopper (4). The concentric auger feeder (10) of the present invention is disposed in the lowermost section of the feed hopper (3) and extends into a conduit (5) that extends from one side of the hopper (4).

Figure 2:
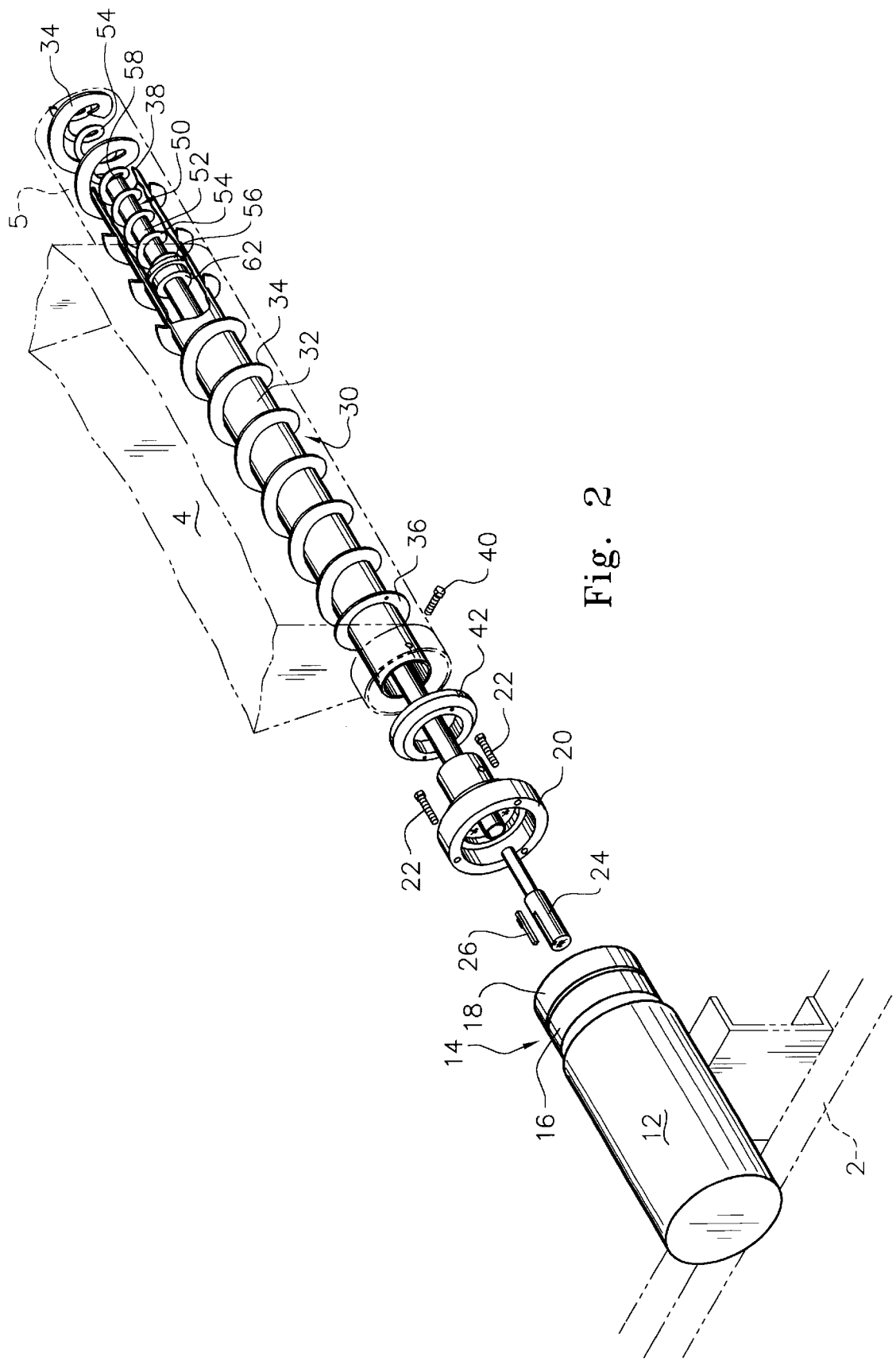
FIG. 2 is an exploded perspective view of the concentric auger feeder showing the drive mechanism for the primary and secondary augers, with a portion of the core of the primary auger cut away to show the concentrically disposed secondary auger.

A 3-phase electric motor drive (12) is mounted on the frame (2) and is operably connected to the concentric auger feeder (10) as illustrated in FIG. 2. An A–C speed drive can be used in combination with the 3-phase motor drive (12) to provide variable motor speeds. An electric clutch (14), including a magnet portion (16), is attached to the output shaft of the motor (12). The armature portion (18) of the clutch (14) is attached to a primary auger hub (20) by bolts (22). The clutch (14) is electrically energized to attract the armature (18) to the magnet (16) to selectively transmit rotary motion from the output shaft of the motor (12) to the primary auger hub (20). A secondary auger hub (24) is attached to the output shaft of the motor (12) by square keystock (26) to transmit rotary motion to the secondary auger hub (24).

The primary auger (30) includes a core (32) and flighting (34) that runs from a steel washer (36) on the motor end and extends beyond the distal end (38) of the core (32) into the conduit (5). The core (32) is attached by hub bolt (40) to the hub (20), and a polyethylene bushing (42) is disposed intermediate the hub (20) and the steel washer (36). The secondary auger (50) includes a core (52) and flighting (54) that runs from a steel washer (56) beyond the distal end (58) of the core (52) into the conduit (5). The core (52) is attached by a plug weld to the secondary auger hub (24), and a polyethylene bushing (62) is attached to the steel washer (56).

The smaller secondary auger (50) is thus concentrically received within the core (32) of the larger primary auger (30). The flighting (34) of the primary auger (30) that extends beyond the distal end (38) of the core (32) is disposed within the conduit (5). Likewise, the flighting (54) of the secondary auger (50) that extends beyond the distal end (58) of the core (52) is disposed within the conduit (5) and also within the flighting (38) of the primary auger (30). The rotating action of the larger and smaller flightings (32 and 52) within the conduit (5) serves to minimize material caking problems.

In operation, a very small secondary auger (50) is placed inside the core diameter of a large primary feeder auger (30). The system is controlled so that when an ingredient first begins to flow—both augers (30 and 50) rotate and convey the primary mass of the material to discharge from the conduit (5) to a weighing hopper (not shown). When the desired quantity of the ingredient becomes close to being delivered to the weighing hopper, the system then cuts off the rotation of the outside primary auger (30) by disengaging the clutch (14) so that only the very small diameter secondary auger (50) rotates. This very small diameter inside auger (50) is then able to convey a final small quantity to yield a precise ingredient cut off capability. The next time the ingredient is selected—once again both augers (30 and 50) will rotate. The rotation of the large diameter auger (30) agitates and easily overcomes the difficult material handling characteristics and recharges the small diameter auger (50) with material that is then available for the small auger (50) to precisely finish the ingredient delivery. The result is a very simple economical conveying system that can handle the most difficult ingredients with extreme speed and accuracy.

Obviously, many modifications and variations of the present invention are possible in light of the above teachings. It is therefore to be understood that, within the scope of the appended claims, the invention may be practiced otherwise than as specifically described.

What is claimed is:

1. A material conveying systems, comprising:
    a primary auger; including a core and a flighting attached to the core for moving material in a first direction;
    a hollow secondary auger disposed substantially coaxially with the primary auger; and including a hollow core and a flighting attached to the core for moving material in said first direction;
    a drive operably attached to the primary and secondary augers; and
    a drive disconnect operably attached to the primary auger.
2. The system of claim 1 wherein the drive disconnect is a clutch.
3. The system of claim 2 wherein the clutch is an electric clutch including a magnet portion and an armature portion.
4. The system of claim 1 wherein the drive is an electric motor.
5. The system of claim 4 wherein the electric motor is a 3-phase electric motor.
6. A material conveying system, comprising:
    a primary auger including a core and a flighting attached to the core; for moving material in a first direction
    a secondary auger disposed within and substantially concentric to the core of the primary auger, the secondary auger including a flighting extending beyond the core of the primary auger; for moving material in said first direction
    a drive operably attached to the primary and secondary augers; and
    a drive disconnect operably attached to the primary auger.
7. The system of claim 6 wherein the flighting of the primary auger extends beyond the core of the primary auger.
8. The system of claim 6 wherein the secondary auger has a core, and the flighting of the secondary auger extends beyond the core of the secondary auger.
9. The system of claim 7 wherein the flighting of the secondary auger extends beyond the core of the secondary auger.
10. The system of claim 6 wherein the drive disconnect is a clutch.
11. The system of claim 10 wherein the clutch is an electric clutch including a magnet portion and an armature portion.
12. The system of claim 6 wherein the drive is an electric motor.
13. The system of claim 12 wherein the electric motor is a 3-phase electric motor.
14. A controlled method of conveying a predetermined amount of a material, comprising the steps of:
    conveying the material by rotation of a large primary auger until the amount of material conveyed closely approaches the predetermined amount;
    discontinuing rotation of the primary auger; and
    conveying the material by rotation of a small secondary auger disposed substantially coaxially with the large primary auger until the amount of material conveyed reaches the predetermined amount.
15. The method of claim 14 further including the step of conveying the material by rotation of the small secondary auger before discontinuing the rotation of the primary auger.
16. The method of claim 15 wherein the primary and secondary augers are simultaneously operated until discontinuing the rotation of the primary auger.
17. The method of claim 14 wherein the primary auger includes a core and flighting attached to the core, wherein the secondary auger is disposed within and substantially concentric to the core of the primary auger, and wherein the secondary auger includes flighting extending beyond the core of the primary auger.
18. The method of claim 15 wherein the primary auger includes a core and flighting attached to the core, wherein the secondary auger is disposed within and substantially concentric to the core of the primary auger, and wherein the secondary auger includes flighting extending beyond the core of the primary auger.
19. The method of claim 16 wherein the primary auger includes a core and flighting attached to the core, wherein the secondary auger is disposed within and substantially concentric to the core of the primary auger, and wherein the secondary auger includes flighting extending beyond the core of the primary auger.
20. A material conveying system, comprising:
    a primary auger having a first end and a second end;
    a secondary auger having a first end and a second end wherein the secondary auger is disposed substantially within and coaxially with of the primary auger;
    a drive operably attached to the first ends of the primary and secondary augers; and
    a drive disconnect operably attached to the first end of the primary auger.
21. The system of claim 20 wherein the drive disconnect is a clutch.
22. The system of claim 21 wherein the clutch is an electric clutch including a magnet portion and an armature portion.
23. The system of claim 20 wherein the drive is an electric motor.
24. The system of claim 23 wherein the electric motor is a 3-phase electric motor.
25. The system as in claim 20 wherein said primary auger includes a core and flighting and said secondary auger at least includes flighting.

* * * * *